(12) United States Patent
Fujie et al.

(10) Patent No.: US 7,495,906 B2
(45) Date of Patent: Feb. 24, 2009

(54) MULTIPLE HARD DISK DRIVE ASSEMBLY COOLING

(75) Inventors: Yoshihiro Fujie, Fujisawa (JP); Kenji Hidaka, Yokohama (JP); Kifumi Numata, Yokohama (JP); Michihiro Okamoto, Kawasaki (JP); Kenneth R. Schneebeli, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/408,366

(22) Filed: Apr. 21, 2006

(65) Prior Publication Data

US 2007/0247805 A1    Oct. 25, 2007

(51) Int. Cl.
*H05K 7/00* (2006.01)
(52) U.S. Cl. ............... 361/685; 435/288.7; 714/43; 705/408
(58) Field of Classification Search ............... 705/1, 705/2, 400, 408; 707/1, 201, 204; 358/1.13, 358/1.15; 435/6, 288.7; 714/6, 43; 361/690, 361/695, 679–687, 724–727
See application file for complete search history.

(56) References Cited

U.S. PATENT DOCUMENTS

| | | | |
|---|---|---|---|
| 5,860,291 A | 1/1999 | Johnson et al. | |
| 6,018,458 A | 1/2000 | Delia et al. | |
| 6,025,989 A | 2/2000 | Ayd et al. | |
| 6,567,271 B2 * | 5/2003 | Stone et al. | 361/724 |
| 6,640,235 B1 * | 10/2003 | Anderson | 708/100 |
| 6,735,080 B1 | 5/2004 | Chang | |
| 6,744,632 B2 | 6/2004 | Wilson et al. | |
| 6,771,499 B2 | 8/2004 | Crippen et al. | |
| 6,819,560 B2 * | 11/2004 | Konshak et al. | 361/687 |
| 6,853,551 B2 | 2/2005 | Baar et al. | |
| 6,958,906 B2 | 10/2005 | Wu et al. | |
| 2002/0122296 A1 | 9/2002 | Stone et al. | |
| 2003/0030976 A1 | 2/2003 | Garnett et al. | |
| 2003/0193776 A1 * | 10/2003 | Bicknell et al. | 361/685 |
| 2004/0100765 A1 | 5/2004 | Crippen et al. | |
| 2007/0098281 A1 * | 5/2007 | Fujie et al. | 382/239 |

* cited by examiner

*Primary Examiner*—Hung V Duong
(74) *Attorney, Agent, or Firm*—Ingrassia Fisher & Lorenz, P.C.

(57) ABSTRACT

A disk-drive storage assembly includes an interface card configurable to couple to a plurality of hard-disk drives. The interface card has a plurality of first vent openings to expose a surface area of each of the plurality of hard-disk drives. A drive chassis tray is coupled to the interface card having a plurality of second vent openings. The second vent openings are staggered to shift the exposed surface area of the hard-disk drives. A disk storage device includes a plurality of hard-disk drives. An interface card is coupled to the plurality of hard-disk drives. The interface card has a plurality of first vent openings to expose a surface area of each of the plurality of hard-disk drives. A drive chassis tray is coupled to the interface card having a plurality of second vent openings defined by a plurality of cross bars.

15 Claims, 5 Drawing Sheets

MULTIPLE HARD DISK DRIVE ASSEMBLY COOLING

BACKGROUND OF THE INVENTION

1. Field of the Invention

The present invention relates in general to computers, and, more particularly, to an apparatus and method of effectively cooling multiple hard disk drives (HDDs) mounted on a HDD tray in a disk array storage system enclosure.

2. Description of the Prior Art

Hard disk drives (HDDs) are typically installed using HDD trays within an enclosure of a server computer system and/or a disk array storage system. FIG. 1 depicts an array 10 of HDDs 12 which are installed in a disk array storage system enclosure 14. In these systems, one HDD is commonly placed on a HDD tray. In the case of a single HDD placed on a HDD tray, no special technique is utilized to keep the HDD cool using forced air. In cases of multiple HDD installed in a system enclosure 14, multiple HDD trays are commonly placed in the front portion of the enclosure 14. Air inlet openings allow forced air to cool the HDDs in the system 14 as air travels from the front of the enclosure 14 to the rear of the enclosure 14.

Prior art enclosures 14 have inherent space limitations when used as previously described. A storage capacity ceiling is created which limits the ability to expand HDD storage capacity. As more HDD trays are added within the limited internal space of a system enclosure 14, the front of the enclosure 14 is filled and cannot accept additional HDDs. Manufacturers have resorted to placing multiple HDDs on a deep HDD tray in a tandem arrangement in order to achieve a more highly-dense installation of HDDs in the existing space. FIG. 2 depicts a high-density assembled disk array storage system 16. System 16 includes a set of three HDDs 12 which are arranged in tandem in a deep HDD tray 18. Trays 18 are inserted in a stacked arrangement into enclosure 14.

Without increasing the surface area of the air inlet openings of each tray 18, the high-density tandem installation of HDDs 12 in a storage system 16 as shown in FIG. 2 results in poor effectiveness in cooling the HDDs 12. HDDs 12 are ineffectively cooled because an insufficient airflow volume results from increased internal airflow impedance. Having a powerful air fan or blower may help to solve this thermal condition. However, other problems can be created as a result, involving aspects of product cost, electrical power supply, acoustic performance and limited internal space. Using a system incorporating a front-to-back airflow cooling method, the front HDDs 12 exhaust pre-heated air toward the rear HDDs 12 in enclosure 14. It is difficult to keep the rear HDDs 12 cooled effectively.

Thus, a need exists for an apparatus and method to effectively and efficiently cool a series of densely arranged HDDs in a storage enclosure without the use of a large fan or similar device. The apparatus and method should take cost and efficiency considerations into account.

SUMMARY OF THE INVENTION

In one embodiment, the present invention is a disk-drive storage assembly comprising an interface card configurable to couple to a plurality of hard-disk drives, the interface card having a plurality of first vent openings to expose a surface area of each of the plurality of hard-disk drives, and a drive chassis tray coupled to the interface card having a plurality of second vent openings, wherein the second vent openings are staggered to shift the exposed surface area of the hard-disk drives.

In another embodiment, the present invention is a disk storage device comprising a plurality of hard-disk drives, an interface card coupled to the plurality of hard-disk drives, the interface card having a plurality of first vent openings to expose a surface area of each of the plurality of hard-disk drives, and a drive chassis tray coupled to the interface card having a plurality of second vent openings defined by a plurality of cross bars, wherein the second vent openings are staggered to shift the exposed surface area of the hard-disk.

In still another embodiment, the present invention is a method of manufacturing a disk-drive storage assembly comprising providing an interface card configurable to couple to a plurality of hard-disk drives, the interface card having a plurality of first vent openings to expose a surface area of each of the plurality of hard-disk drives; and providing a drive chassis tray coupled to the interface card having a plurality of second vent openings, wherein the second vent openings are staggered to shift the exposed surface area of the hard-disk drives.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
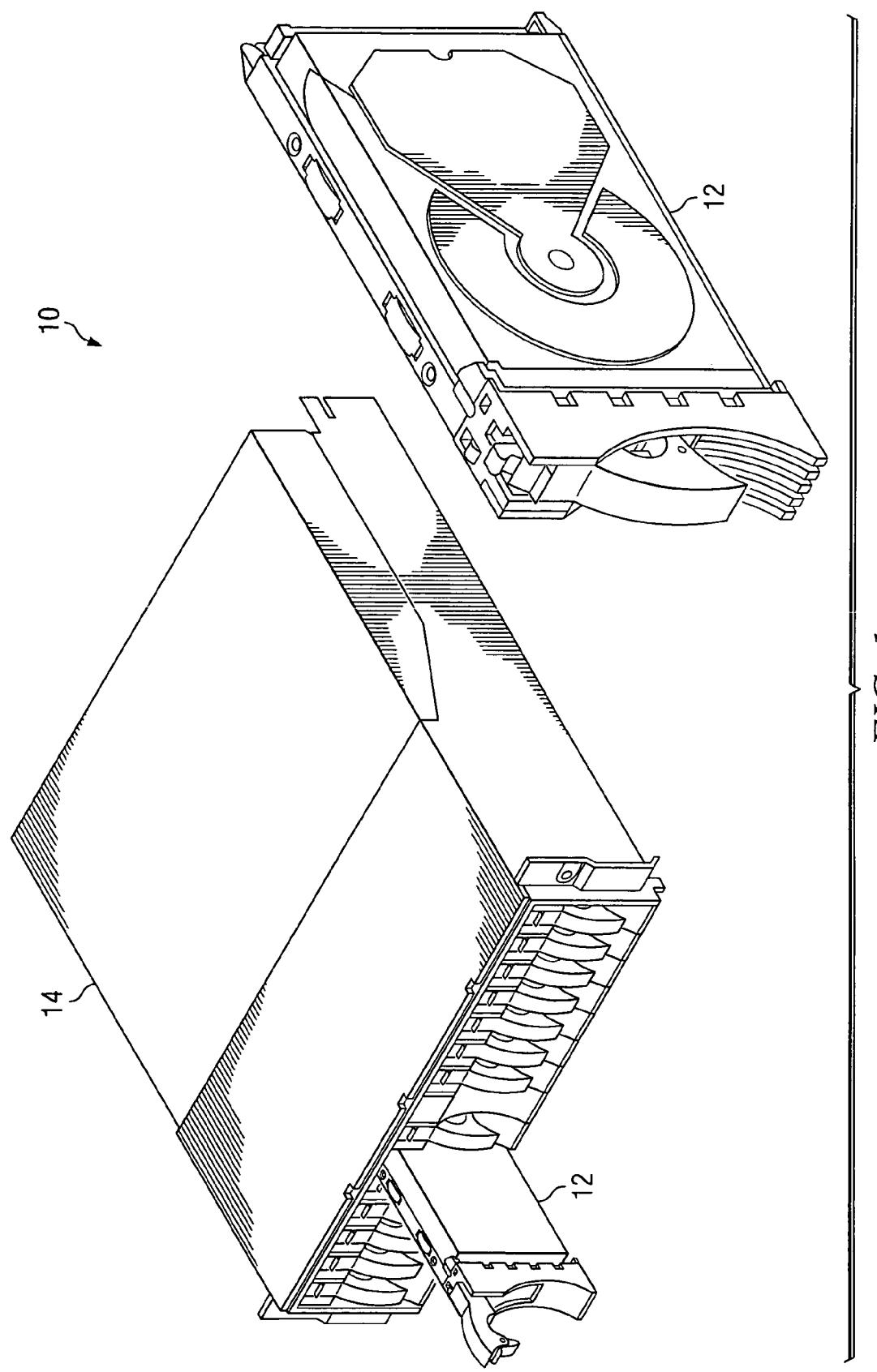
FIG. 1 illustrates a prior art example of a storage enclosure with multiple HDDs.

Turning to FIG. 1, a prior art example 10 of a HDD storage enclosure 14 is shown. Enclosure 14 includes HDDs 12 which are inserted into enclosure 14 as shown. Commonly, a single HDD 12 is placed on a HDD tray and inserted into enclosure 14. The HDD 12 is kept cool by forced air usually produced by a fan located in close proximity to the enclosure 14. Historically, to keep sufficient airflow moving through the enclosure 14, a sufficient number of air inlet openings were required in the front portion of enclosure 14.

Figure 2:
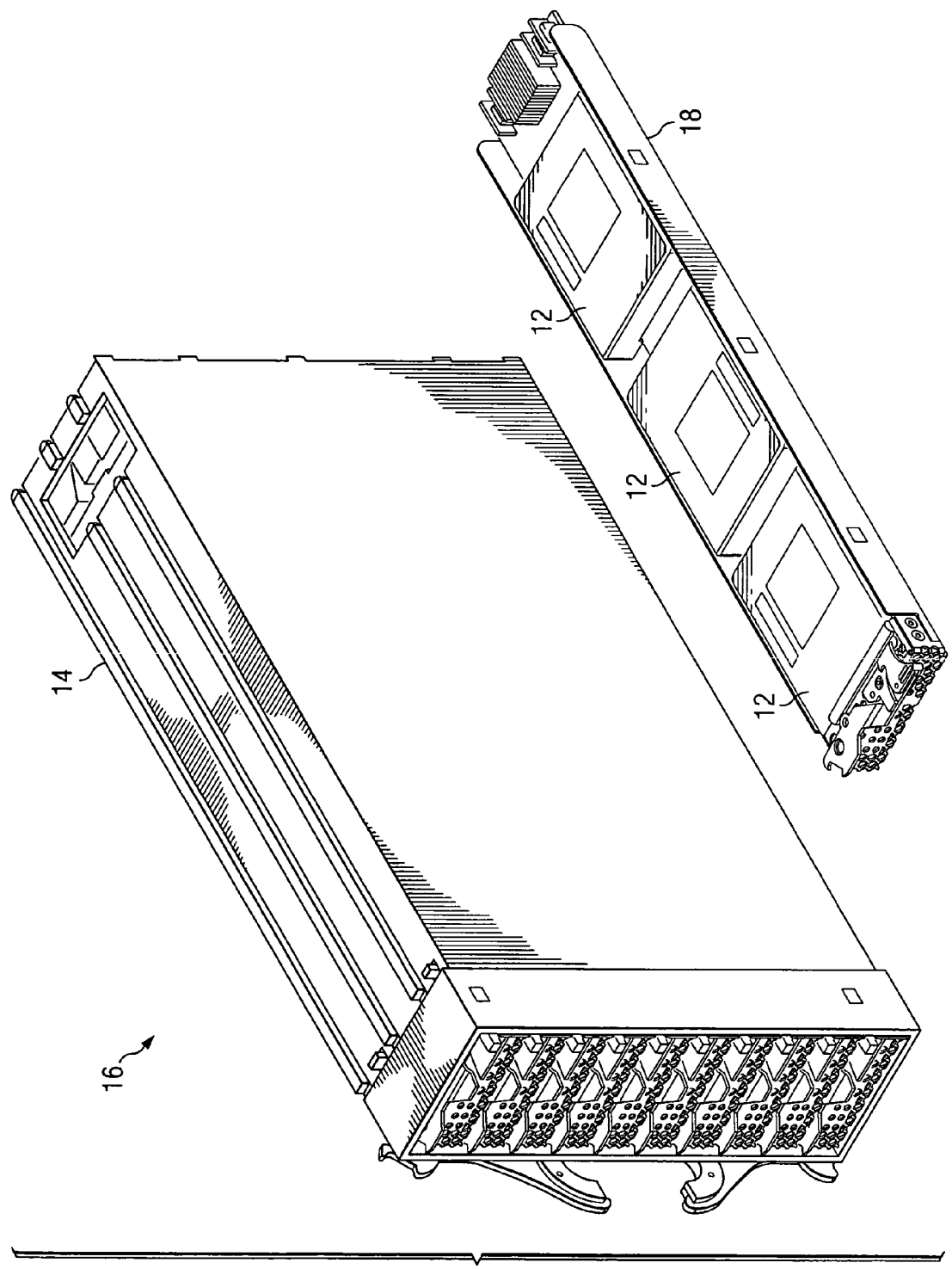
FIG. 2 illustrates a second example of a storage enclosure using a high-density installation of multiple HDDs on a tray in a tandem arrangement.

FIG. 2 shows an example of HDDs 12 which are located in a higher-density tandem arrangement on a HDD tray 18. A series of HDD trays 18 having HDDs 12 are inserted into enclosure 14. By increasing the density of HDDs as shown, greater airflow impedance and lower overall airflow volume is seen through the enclosure 14. Higher airflow impedance leads to poor cooling effectiveness.

Figure 3:
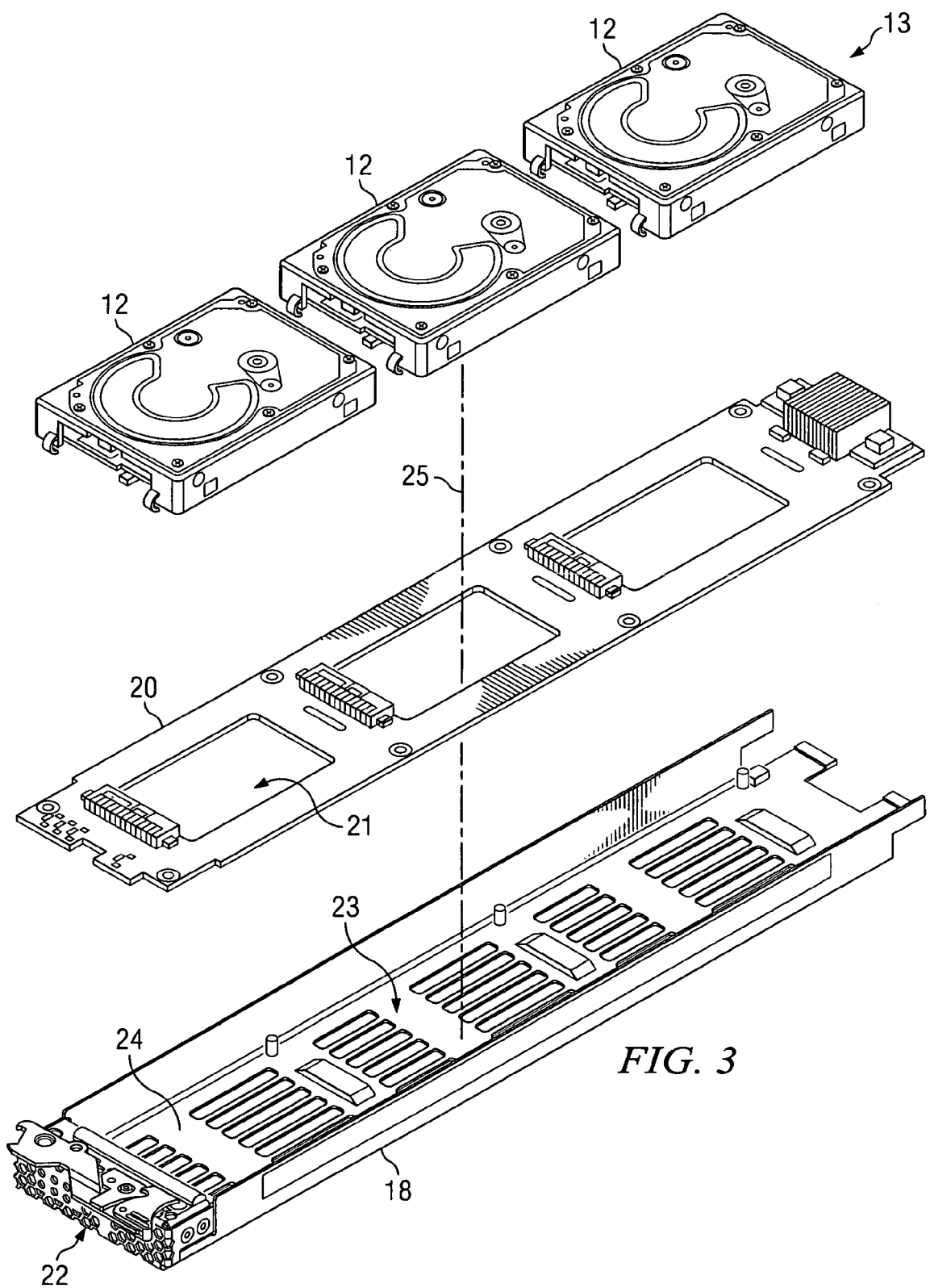
FIG. 3 illustrates a blow-up diagram of a HDD tray chassis, an interface card, and a series of HDDs in tandem arrangement.

FIG. 3 illustrates an example assembly 13 to improve cooling effectiveness in higher-density HDD storage enclosures according to the present invention. Interface card 20 is placed into tray chassis 18 and fastened with screws. HDDs 12 are placed and stacked directly on top of interface card 18, and plugged into the interface connectors located as part of interface card 20.

Each HDD 12 is fastened with screws at the side walls or at the bottom of HDD 12. A higher-density assembly 13 can be achieved, resulting in a more compact HDD tray 18 footprint by stacking the HDDs 12 directly on top of interface card 20 rather than placing HDDs 12 horizontally. HDDs 12 are plugged directly into the interface connectors located as part of interface card 20 at the shortest pass. As a result, interface card 20 can achieve high density and accommodate additional components and/or wiring space for redundant power supply circuitry and advanced disk control functions.

Interface card 20 includes large vent openings 21. Vent openings 21 are approximately the same size as HDDs 12 and are located to allow a large surface area of the bottom of HDDs 12 to be exposed through the interface card 20. Vent openings 21 allow air to come into contact with the control card of HDDs 12.

Tray 18 includes an air inlet panel 22 with a camming lever mechanism. In addition to vent openings 21 in interface card 20, an additional set of vent openings 23 are located as part of HDD tray chassis 18. Vent openings 23 serve to boost effective air cooling of the HDDs 12 by reducing airflow impedance caused by the HDDs 12. At the same time, openings 23 allow for space through the HDD tray 18 to allow air to pass through tray 18.

To reduce airflow impedance caused by multiple HDDs 12 mounted in a tandem arrangement as shown in FIG. 3, where multiple HDD trays 18 are installed within a disk array storage enclosure 14, openings 23 in chassis 18 are staggered in arrangement. In one embodiment, the vent opening 23 location is shifted by approximately one-half. Cross-bar 24, which forms ladder-shaped openings 23 are approximately located along the centerline 25 of the control card of HDDs 12.

Figure 4:
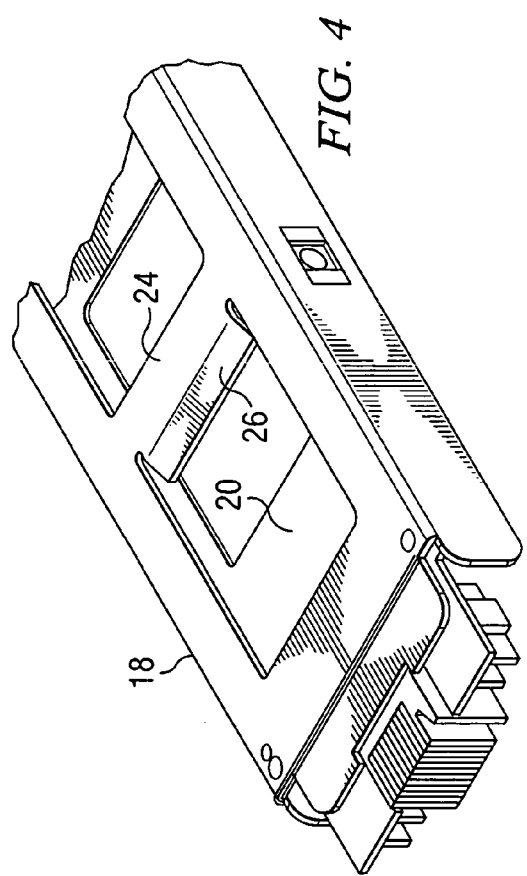
FIG. 4 illustrates a bottom view of a HDD tray chassis including a cross bar structure.

Turning to FIG. 4, a bottom view of tray 18 coupled to an interface card 20 is shown. Card 20 includes a set of vent openings. Tray 18 also includes a set of vent openings. The set of vent openings integrated into tray 18 are staggered, such that the surface area exposed to allow air through both sets of vent openings to reach the HDDs 12 is shifted as depicted.

Again, in FIG. 4, a cross bar 24 is shown. A plurality of cross bars 24 are integrated into tray 18. Cross bars 24 provide structural support and also define the vent openings of tray 18. Coupled to cross bar 24 is deflector 26. Deflector 26 is a device, which in some embodiments, directs air towards the surface of HDDs 12. Deflector 26 is an optional feature of tray 18. In many cases, deflector 26 is not required, and may increase airflow impedance to an undesired extent.

Figure 5:
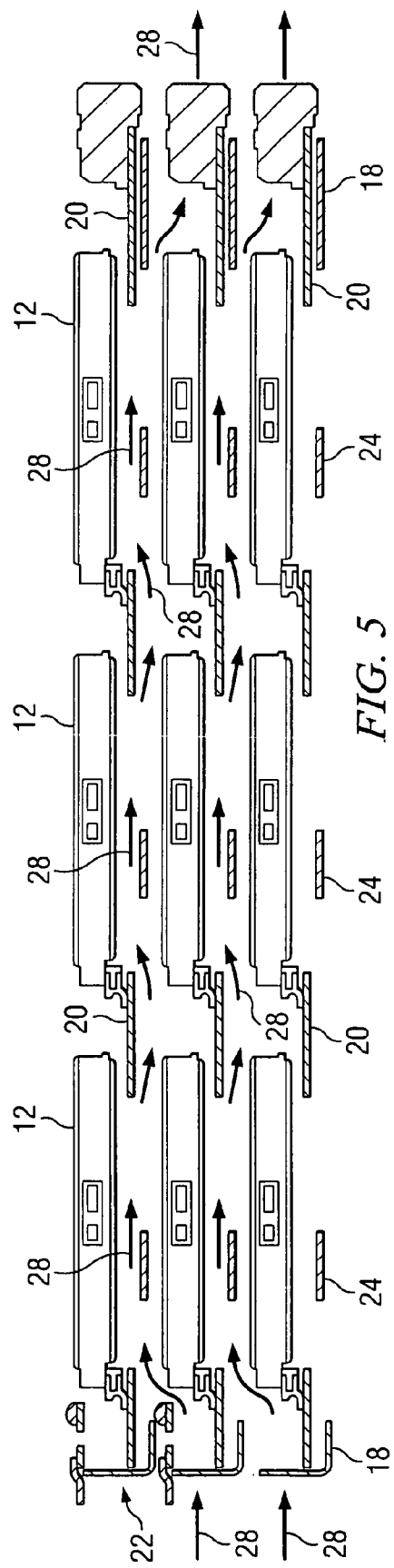
FIG. 5 illustrates a cutaway view of a HDD tray chassis, interface card, and HDDs in a tandem arrangement and depicts air movement.

FIG. 5 depicts a cut-away illustration of a set of HDDs 12 which are coupled to interface cards 20 and trays 18. Again, a series of HDDs, 12, cards 20 and trays 18 can be arranged in a high-density setting. FIG. 5 shows a three-by-three matrix of HDDs 12. Additional HDDs 12 can be arranged in tandem to increase depth or width for a particular application. As shown in FIG. 5, a series of air inlets 22 are integrated into tray 18 as previously depicted.

A series of arrows 28 depicts airflow movement through the disk storage device. Airflow 28 enters the air inlet 22 as depicted. Airflow 28 can be initiated by a fan located in close proximity to either the front or rear portion of the storage device. The airflow 28 moves through the series of staggered vent openings in card 20 and tray 18 as shown. The airflow 28 moves up through vent openings to make contact with the bottom surface area of HDDs 12. As air passes by the surfaces of HDDs 12, heat is transferred from the surface of HDDs 12 to the airflow 28. Airflow 28 continues through the storage device and exits to the right as shown.

As depicted in FIG. 5, tray 18 has a bottom side with integrated vent openings. The opposing side of tray 18 is left uncovered or louvered. By leaving the opposing side of the tray 18 uncovered or louvered, the entire top surface areas of the series of HDDs 12 are exposed to airflow 28. As a result, in addition to airflow 28 passing up through the vent openings to contact the bottom surface areas of HDDs 12, a portion of airflow 28 makes contact with the top surface areas of HDDs 12. The depicted design of tray 18 allows for sufficient structural support of the HDDs 12, while allowing for maximum surface area exposure of HDDs 12 and thereby providing increased thermal transfer to airflow 28.

Figure 6:
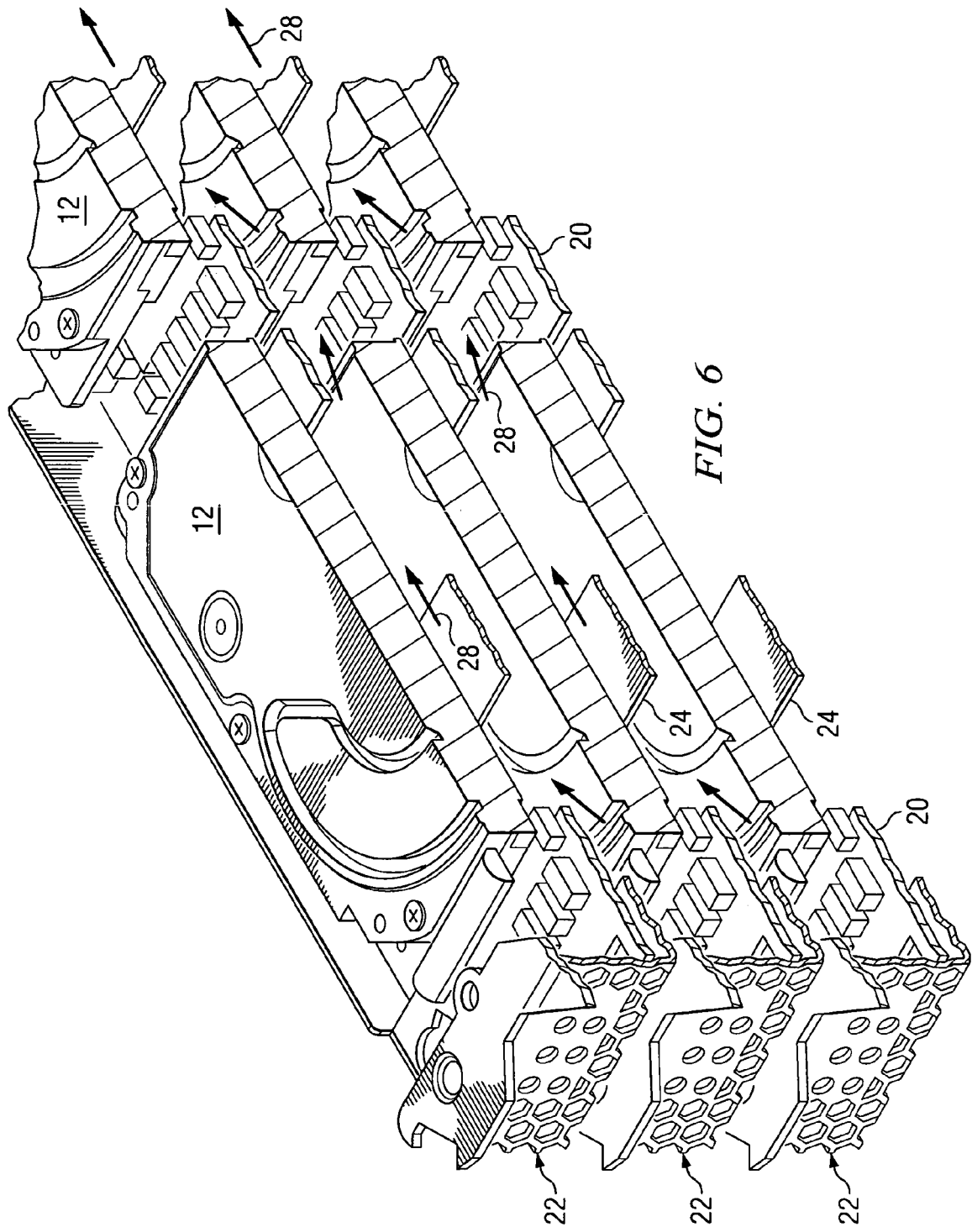
FIG. 6 illustrates an additional airflow depiction of the HDD tray chassis, interface card, and HDDs in tandem arrangement.

Turning to FIG. 6, a second cut-away diagram of a series of HDDs 12 with cards 20 and trays 18 are depicted. Again, airflow 28 is shown moving from air inlets 22 through vent openings integrated into card 20 and tray 18. Airflow 28 moves over crossbars 24 where the airflow 28 comes into contact with the bottom surface areas of HDDs 12. Airflow 28 exits to the right as shown.

The use of vent openings as part of interface card 20 and tray 18 which are staggered to shift the exposed lower surface areas of HDDs 12 allows for proper airflow circulation in higher density storage enclosures where HDDs 12 are arranged in tandem. In addition, by not enclosing the opposing side of tray 18 to cover the upper surface areas of HDDs 12, increased thermal transfer is achieved and greater overall cooling effectiveness is realized. Finally, the use of staggered vent openings allows proper air circulation without increasing or decreasing airflow impedance to undesired levels, so that all components of a storage device enclosure or the overall system are adequately cooled.

While one or more embodiments of the present invention have been illustrated in detail, the skilled artisan will appreciate that modifications and adaptations to those embodiments may be made without departing from the scope of the present invention as set forth in the following claims.

What is claimed is:

1. A disk-drive storage assembly, comprising:
an interface card configurable to couple to a plurality of hard-disk drives, the interface card having a plurality of first vent openings to expose a surface area of each of the plurality of hard-disk drives; and
a drive chassis tray coupled to the interface card having a plurality of second vent openings, wherein the second vent openings are staggered to shift exposed surface areas of the hard-disk drives.

2. The assembly of claim 1, wherein the disk-drive storage assembly further comprises a blade form factor for insertion into a blade server computer system.

3. The assembly of claim 1, wherein the drive chassis tray further includes a cross bar which forms a portion of a periphery of the second vent openings.

4. The assembly of claim 3, further including a deflector coupled to the cross bar to direct airflow toward the plurality of hard-disk drives.

5. The assembly of claim 1, wherein an opposing side of the drive chassis tray having the plurality of second vent openings is uncovered or louvered to allow for an increased airflow volume through the assembly.

6. A disk storage device, comprising:

a plurality of hard-disk drives, an interface card coupled to the plurality of hard-disk drives, the interface card having a plurality of first vent openings to expose a surface area of each of the plurality of hard-disk drives; and a drive chassis tray coupled to the interface card having a plurality of second vent openings defined by a plurality of cross bars, wherein the second vent openings are staggered to shift exposed surface areas of the hard-disk.

7. The device of claim 6, wherein the disk storage device further comprises a blade form factor for insertion into a blade server computer system.

8. The device of claim 6, wherein an opposing side of the drive chassis tray having the plurality of second vent openings is uncovered or louvered to allow for an increased airflow volume through the assembly.

9. The device of claim 6, further including a deflector coupled to each of the plurality of cross bars to direct airflow toward the plurality of hard-disk drives.

10. The device of claim 6, wherein each of the plurality of cross bars are configured to centrally cross the plurality of first vent openings.

11. A method of manufacturing a disk-drive storage assembly, comprising:

providing an interface card configurable to couple to a plurality of hard-disk drives, the interface card having a plurality of first vent openings to expose a surface area of each of the plurality of hard-disk drives; and providing a drive chassis tray coupled to the interface card having a plurality of second vent openings, wherein the second vent openings are staggered to shift exposed surface areas of the hard-disk drives.

12. The method of claim 11, wherein the disk-drive storage assembly further comprises a blade form factor for insertion into a blade server computer system.

13. The method of claim 11, wherein the drive chassis tray further includes a cross bar which forms a portion of a periphery of the second vent openings.

14. The method of claim 13, further including providing a deflector coupled to the cross bar to direct airflow toward the plurality of hard-disk drives.

15. The method of claim 11, wherein an opposing side of the drive chassis tray having the plurality of second vent openings is uncovered or louvered to allow for an increased airflow volume through the assembly.

* * * * *